United States Patent Office 3,672,842
Patented June 27, 1972

3,672,842
WRITING INSTRUMENT AND INDICATOR METHOD
Walter Florin, 36 Wood Lane, Woodmere, N.Y. 11598
No Drawing. Filed June 2, 1969, Ser. No. 829,810
Int. Cl. G01n 21/08, 21/20; C09d 11/12
U.S. Cl. 23—230 R
12 Claims

ABSTRACT OF THE DISCLOSURE

A marking tool for detecting the presence of suspected chemical substances on or adjacent to or even constituting a surface by dispensing therefrom upon the said surface a reagent, in solid or liquid form, which is capable of undergoing colorimetric change upon reaction with the chemical substances, the reaction being permitted to occur in a film environment at the situs of the mark. Crayons, pencils, nibbed pens, ball point pens and other stylus-like containers or writing instruments are considered within the scope of this invention. The reagents may be any detecting dye or other chemical substance which is susceptible of a color change during the described reaction, thereby indicating the presence of the chemical substance.

BACKGROUND OF THE INVENTION

This invention relates to a surface marking instrument for applying a reagent material manually on a surface. In particular, this invention has to do with a writing instrument containing a colorimetric reagent for detecting the presence of chemicals on a surface.

DESCRIPTION OF THE PRIOR ART

The surfaces of modern equipment in everyday home or commercial use are subject to the presence of many chemicals, some of which are highly corrosive. The ability to ascertain the presence of such chemicals by rapid on-the-spot analysis could therefore provide an unusually convenient and advantageous opportunity. Unfortunately, analytical tests of surfaces cannot be carried out with reagents except by titration or a pH meter in laboratory equipment or by indicator test papers, such as disclosed in U.S. 2,915,373 and 3,238,020. Such methods are inconvenient to timely maintenance of an operating plant. Very often, they require taking samples of the surface, even pieces of equipment, and removing it to a laboratory and then dissolving the suspected chemical in a solvent prior to analysis. Furthermore, such methods cannot be used accurately to detect surface-adsorbed or insoluble substances. Although the use of indicator papers is usually very convenient, particularly in the laboratory, in an operating plant too often the surfaces to be tested are not satisfactory for proper analysis by such means.

SUMMARY OF THE INVENTION

It has now been discovered that a chemical substance on or adjacent to or within a surface may be detected by marking said surface with a reagent capable of undergoing colorimetric change upon reaction with said chemical substances by permitting said reaction to take place. The marking of the surface is carried out by using a novel marking instrument capable of dispensing the reagent as a film or mark of small area with respect to the area of the said surface.

Broadly, the marking instrument is in a stylus form by means of which a reagent can be applied as a narrow mark upon a surface. For the purpose of this invention a stylus consists of a barrel of circular or angular cross-section which contains the reagent.

Such instruments include crayons, pencils, fountain pens, ball-point pens, fiber-tip pens and the like. The length and diameter of the instrument is not critical, but may be that normally used in everyday writing instruments. If a surface to be marked is relatively inaccessible by normal reaching of the operator, the barrel of the instrument may be longer. The instrument may also be stationary, positioned near the surface to be tested, and intermittent or periodic or even continuous markings may be applied, depending upon the desired use.

The most preferred stylus forms of instrument are those most convenient to manufacture and use by hand. Crayons, in which the reagent and a solid carrier are shaped as the barrel of the stylus itself, e.g., cylinder or rod, and may be wrapped in paper, or any other suitable covering or fitted as a "lead" in wooden pencils or in mechanical pencils of the spring- or screw-type, and fountain, ball-point pens, and fiber-tip pens in which the reagent-carrier mixture is a liquid, are the most common forms. Mechanical pencils having a number of different "leads" in a single barrel may also be used.

As stated, the reagents used in the novel marking instruments of this invention may be any reactive substance which changes color detectably upon reaction with the chemical being tested. Such reagents include organic and inorganic reagents, preferably phthalic acid derivatives, e.g., phenolphthaleins, sulphonphthaleins, fluoresceins and like dyes; nitrogen-containing compounds, such as ammonia, the azo dyes, heterocyclic nitrogen compounds, rosaniline dyes, or azine dyes; anthroquinones; aromatic sulfonic acids; diarylmethanes; metal salts such as alkali metal salts and iron-containing salts, and metal hydroxides. The reagents may be used to detect the presence of acids and bases, metallic ions, nonmetallic elements and organic and inorganic compounds.

Specifically, but without being limited thereto, such reagents include litmus, methyl orange, methyl red, phenolphthaleins, thymolphthaleins, sulfonphthaleins, phenolsulfonphthaleins, fluoresceins, pyrocatechol blue, malachite green, thymol blue, bromothymol blue, crystal violet, ferric chloride, ferric hexathiocyanatoferriate (ferrox), ferrous hydroxide, hydroxylamine hydrochloride, potassium iodide, potassium chromate, potassium thiocyanate, potassium ferricyanide, potassium ferrocyanide, ammonia, rhodamine-B, dimethylglyoxime, alpha-nitroso-beta-naphthol, anthroquinones, xanthenes, naphthol sulfinic acids, pyrrole, bipyridines, p-nitrobenzene azoresorcinol, and many other known colorimetric reagents.

In the most preferred aspect of this invention, the reagents are blended with a variety of non-reactive, colorless solid carriers such as waxes and greases, including animal and vegetable waxes, higher monohydric alcohols and polyhydric alcohols having from about 6 to about 30 carbon atoms, and preferably 12 to 30, mono- and diglycerides, polymeric alcohols, solid acids having from 12 to 30 carbon atoms, and the like. Such carriers include, more specifically, cetyl alcohol, stearyl alcohol, eicosyl alcohol, stearic acid, solid glycols, such as trimethylpentanediol, solid polyalkylene glycols, especially polyethylene glycols (Carbowaxes) and polypropylene glycols, and lower alkyl-oxy derivatives thereof, such as methoxy, and solid esters prepared from the above acids and alcohols, including as well sorbitol, mannitol and inositol. In fact, any inert solid substance which can be blended with the reagent and which can be worn down gradually by use, such as by friction, thus dispensing the reagent at a controlled rate, may be used herein. The most preferred carriers are polyethylene glycols having molecular weights ranging from about 800 to about 6000, or having at least 18 repeating oxyethylene groups, and solid esters with acids having 12 to 30 carbon atoms, and a polyethylene glycol.

The normally liquid or solid reagent can be combined with the solid carrier either in a dissolved or molten state, or it may be blended or milled therewith as a solid and later fused. Preferably, these carriers are liquefiable either by solvent or by heat, that is, molten or thermoplastic, to obtain uniform mixing. In preferred cases, the reagent and the carrier are simply heated together and stirred to effect solution or uniform dispersion and permitted to cool to a solid. As fillers for pencils or crayons, the resulting solid mixture may be shaped by cutting, molding, casting, extruding or other common shaping means. If necessary, perhaps owing to the insolubility of the reagent in the carrier or because the carrier is not liquefiable, the reagent may be dispersed by milling the reagent in the solid carrier on heated rollers or in a ball mill, or the like, to effect uniform mixing, and subsequently compressing the mixture by molding.

The concentration of the reagent in the mix generally depends upon the miscibility or dispersibility of the reagent in the carrier, the type of color response desired, and the surface upon which the mark is to be applied. Broadly, the concentration may range from about 0.01% to about 50% by weight, and preferably from about 0.05% to about 20%, although from about 0.1% to about 10% is usually satisfactory. Several different reagents may be present in the mixture to provide a variety of testing applications. The aforementioned broader concentrations may be used as the total reagent content.

Any surface may be used for detecting the presence of chemical compounds. Surfaces of metals, wood, paper, plastic, glass, fiber, including cotton, wool, synthetics, e.g. Saran, nylon, rayon, cellulose, cellulose-acetate, Dacron, and mixtures of these. Painted surfaces and surfaces having plastic coatings, such as hot melts or polyvinyls, polyethylene, and even living vegetable and animal surfaces are included in the scope of this invention.

The marking instrument of this invention enables one, for example, to detect chemical leaks in pipes, acidic condensation on surfaces, the uniformity of metal plating, and even the chemical composition of the surface itself without removing samples from the place of use. By simply marking the surface with the novel instrument of this invention, and wetting the mark with distilled or de-ionized water or other suitable solvent or marking a surface already so moistened, the result can be obtained with little difficulty. Moreover, the novel writing instrument of this invention can reach out-of-the-way surfaces not easily accessible without removing obstructive objects.

The reaction of the reagent with the chemical to be detected occurs at the surface within the film created by the mark. In other words, by the addition of several drops of water or other solvent, usually no more is necessary than to moisten the mark, the reagent and chemical have sufficient environment to enter a thin-film reaction, resulting in the color change. If desired, the writing instrument may be a pen in which the ink contains water or a mixture of water and alcohol as the carrier, thus providing the moistening step in situ. If the marking instrument is in the form of a pencil or crayon, the water addition is usually necessary as a separate step. The mark may be made on a pre-moistened surface, causing the reaction to occur almost at once. For convenience, color codes may be placed along the barrel of the instrument to permit a human operator to obtain results rapidly, as in the case of pH measurement.

The description heretofore has presented a number of general and preferred forms of this invention. The following examples represent only an illustration of the invention and are not limitations thereof. The polyoxyethylene used in forming the ester carriers for the reagents have repeating units of 20 or more.

EXAMPLE 1

In a suitable container are added 10 grams of sorbitan monopalmitate and 0.5 gram of 2,2'-bipyridine. The mixture is heated to about 70° C. with stirring until a clear solution is obtained. The solution is cooled to room temperature. The resulting solid is molded into a crayon.

A steel surface pre-moistened with one or two drops of distilled water is marked with the crayon. The colorless mark turns red. This result evidences the presence of ferrous ions.

EXAMPLE 2

In a suitable container are added 10 grams of the ester of polyoxyethylene and castor oil and 1 gram of phenolphthalein. The mixture is heated gently until a clear solution is obtained. The solution is cooled and the resulting solid is molded into a crayon as in Example 1.

A sheet of paper is moistened with distilled water and marked with the crayon. The marked paper is placed in an area in which ammonia vapor is present; the mark turns a bright red. This result evidences the presence of a strong base.

EXAMPLE 3

In a suitable container are added 10 grams of polyoxyethylene sorbitan tristearate, 0.1 gram of thymol blue, 0.1 gram of brom thymol blue, and 0.1 gram of methyl red. The mixture is heated gently until a clear solution is obtained. The solution is cooled and the resulting solid is molded into a solid cylinder, or "lead." The lead is fitted into a screw-type pencil.

The pencil is used to mark a moistened cotton surface of a pH of about 7. The mark turns green. The pencil is used to mark a moistened wood surface. The wood is brought into an atmosphere of hydrochloric acid vapor; the mark turns red. The pencil is used to mark a steel surface. The mark is moistened with one or two drops of dilute aqueous sodium hydroxide solution; the mark turns blue. Hence the same writing instrument is capable of differentiating over the entire pH range.

EXAMPLE 4

In a suitable container, 0.1 gram of potassium ferricyanide and 0.25 gram of sodium chloride are dissolved in 2 ml. of distilled water. The resulting solution is added to 10 grams of a normally solid polyethylene glycol, heated to molten. The resulting mixture is permitted to cool to a solid and then molded into a crayon which leaves a yellow mark.

A nickel-plated iron surface is marked with this crayon and moistened. The yellow mark turns blue at any spot not covered by the nickel, indicating minute pores in the plating.

The scope of this invention includes all of the specific descriptions hereinabove stated, including obvious modifications thereof, and as set forth in the following claims:

I claim:

1. A marking instrument for detecting the presence of a chemical at a surface by dispensing upon said surface a mark containing a composition consisting essentially of (1) from about 0.05% to about 20% by weight of at least one reagent capable of undergoing a colorimetric change by reaction with said chemical to be detected when said chemical, previously external to the composition of said mark, comes in contact therewith and (2) as the major component of said composition an inert carrier selected from the group consisting of a polyethylene glycol, a polypropylene glycol, methoxy derivatives thereof and solid esters thereof with carboxylic acids having from 12 to 30 carbon atoms and solid esters of carboxylic acids having from 12 to 30 carbon atoms and monohydric alcohols and polyhydric alcohols having from 6 to 30 carbon atoms, said inert carrier admixed with said reagent, said admixture capable of marking said surface.

2. The instrument of claim 1 wherein the reagent is phenolphthalein.

3. The instrument of claim 1 wherein the reagent is sulphonphthalein.

4. The instrument of claim 1 wherein the reagent is an azo dye.

5. The instrument of claim 1 wherein the reagent is bipyridine.

6. The instrument of claim 1 wherein the reagent is selected from the group consisting of thymol blue, from thymol blue, methyl red, and mixtures thereof.

7. The instrument of claim 1 wherein the said reagent is selected from the group consisting of a phthalein derivative, a sulphonphthalein derivative, an azo dye, an azine dye, a nitroso compound, a heterocyclic nitrogen compound, an aromatic sulfinic acid dye, an anthroquinone dye, a rosaniline dye and a malachite green dye.

8. The instrument of claim 1 wherein the said reagent is a metal salt selected from the group consisting of an alkali metal iodide, chromate, thiocyanate, ferricyanide, and ferrocyanide salt, and ferric chloride, ferric hexathiocyanatoferriate, and ferrous hydroxide.

9. The instrument of claim 1 wherein the reagent concentration in the composition is from about 0.1% to about 10% by weight and the remainder is a carrier selected from the group consisting of polyethylene glycol having a molecular weight of from about 800 to about 6000 and solid esters thereof with a carboxylic acid having from 12 to 30 carbon atoms.

10. The instrument of claim 1 wherein the reagent concentration in the composition is from about 0.05% to about 20% by weight and the remainder is selected from the group consisting of a polyethylene glycol having a molecular weight of from about 800 to about 6000 and solid esters of said polyethylene glycol and monohydric alcohols and polyhydric alcohols having from 6 to 30 carbon atoms with carboxylic acids having from 12 to 30 carbon atoms.

11. The instrument of claim 10 wherein the carrier is selected from the group consisting of sorbitan monopalmitate, the ester of polyoxyethylene and castor oil, and polyoxyethylene sorbitan tristearate.

12. The method of detecting a chemical substance at a surface by the steps of (1) marking the said surface with the instrument of claim 1 containing a colorimetric reagent reactive with said chemical, and (2) causing the said reaction to occur in a thin film phase by moistening the said surface mark.

References Cited

UNITED STATES PATENTS

| | | | |
|---|---|---|---|
| 2,809,116 | 10/1957 | Laskowski | 23—253 |
| 2,929,791 | 3/1960 | Pfeil | 23—230 X |
| 2,229,155 | 1/1941 | Wenker | 23—253 |
| 3,287,156 | 11/1966 | Griffith | 23—253 |
| 3,386,807 | 6/1968 | Edenbaum | 23—253 |
| 3,627,546 | 12/1971 | Coppeta | 106—31 |
| 2,623,827 | 12/1952 | Moos | 106—23 |
| 3,311,479 | 3/1967 | Alburger | 106—19 |
| 3,557,015 | 1/1971 | Alburger | 106—19 |

OTHER REFERENCES

Atlas, Surface Active Agents, 1948, Table 1.

MORRIS O. WOLK, Primary Examiner

E. A. KATZ, Assistant Examiner

U.S. Cl. X.R.

23—253 TP; 106—19, 21, 22, 31, 272; 252—408